(12) United States Patent
Bertolotti

(10) Patent No.: US 9,075,168 B2
(45) Date of Patent: Jul. 7, 2015

(54) METEOROLOGICAL MEASUREMENT SYSTEM

(75) Inventor: Fabio Bertolotti, Bad Bentheim (DE)

(73) Assignee: SSB Wind Systems GmbH & Co. KG, Salzbergen (DE)

( * ) Notice: Subject to any disclaimer, the term of this patent is extended or adjusted under 35 U.S.C. 154(b) by 0 days.

(21) Appl. No.: 13/885,205

(22) PCT Filed: Nov. 7, 2011

(86) PCT No.: PCT/EP2011/069578
§ 371 (c)(1),
(2), (4) Date: May 14, 2013

(87) PCT Pub. No.: WO2012/065876
PCT Pub. Date: May 24, 2012

(65) Prior Publication Data
US 2013/0228010 A1    Sep. 5, 2013

(30) Foreign Application Priority Data

Nov. 18, 2010  (DE) .......................... 10 2010 060 663

(51) Int. Cl.
*G01W 1/00*  (2006.01)
*G01W 1/02*  (2006.01)
*G01S 15/88*  (2006.01)
(Continued)

(52) U.S. Cl.
CPC ................ *G01W 1/02* (2013.01); *G01S 15/885* (2013.01); *G01S 17/95* (2013.01); *G01W 1/04* (2013.01)

(58) Field of Classification Search
USPC .......................................... 73/170.16–170.28
See application file for complete search history.

(56) References Cited

U.S. PATENT DOCUMENTS 7,281,891 B2 * 10/2007 Smith et al. .................... 415/4.3
7,311,000 B2 * 12/2007 Smith et al. ................ 73/170.11
7,983,844 B2 *  7/2011 Beach et al. ...................... 702/3
(Continued)

FOREIGN PATENT DOCUMENTS

DE    102004044211 A1   3/2006
DE   10 2004 051 843 A1   4/2006
(Continued)

OTHER PUBLICATIONS

D Kindler, M Courtney, A Oldroyd: "Testing and calibration of various LiDAR remote sensing devices for a 2 year offshore wind measurement campaign," Mar. 2009, XP00267044, Retrieved from the Internet: URL:http://www.norsewind.eu/public/downloads/EWEC2009_LiDAR_Validation.pdf.
(Continued)

*Primary Examiner* — Andre Allen
(74) *Attorney, Agent, or Firm* — Harness, Dickey & Pierce, P.L.C.

(57) ABSTRACT

A meteorological measurement system is disclosed having a meteorological mast which extends upwards from a base and supports one or more wind gauges. At least one of the wind gauges is disposed in the region of the upper tip of the mast and is designed as a remote wind gauge for measuring wind conditions at one or more remote measurement locations situated above the mast tip at a distance from the remote wind gauge. At least another wind gauge is disposed in the region of the upper tip of the mast in close spatial proximity to the remote wind gauge and is designed as a local wind gauge for measuring wind characteristics at the location of the remote wind gauge.

35 Claims, 5 Drawing Sheets

Figure 1:
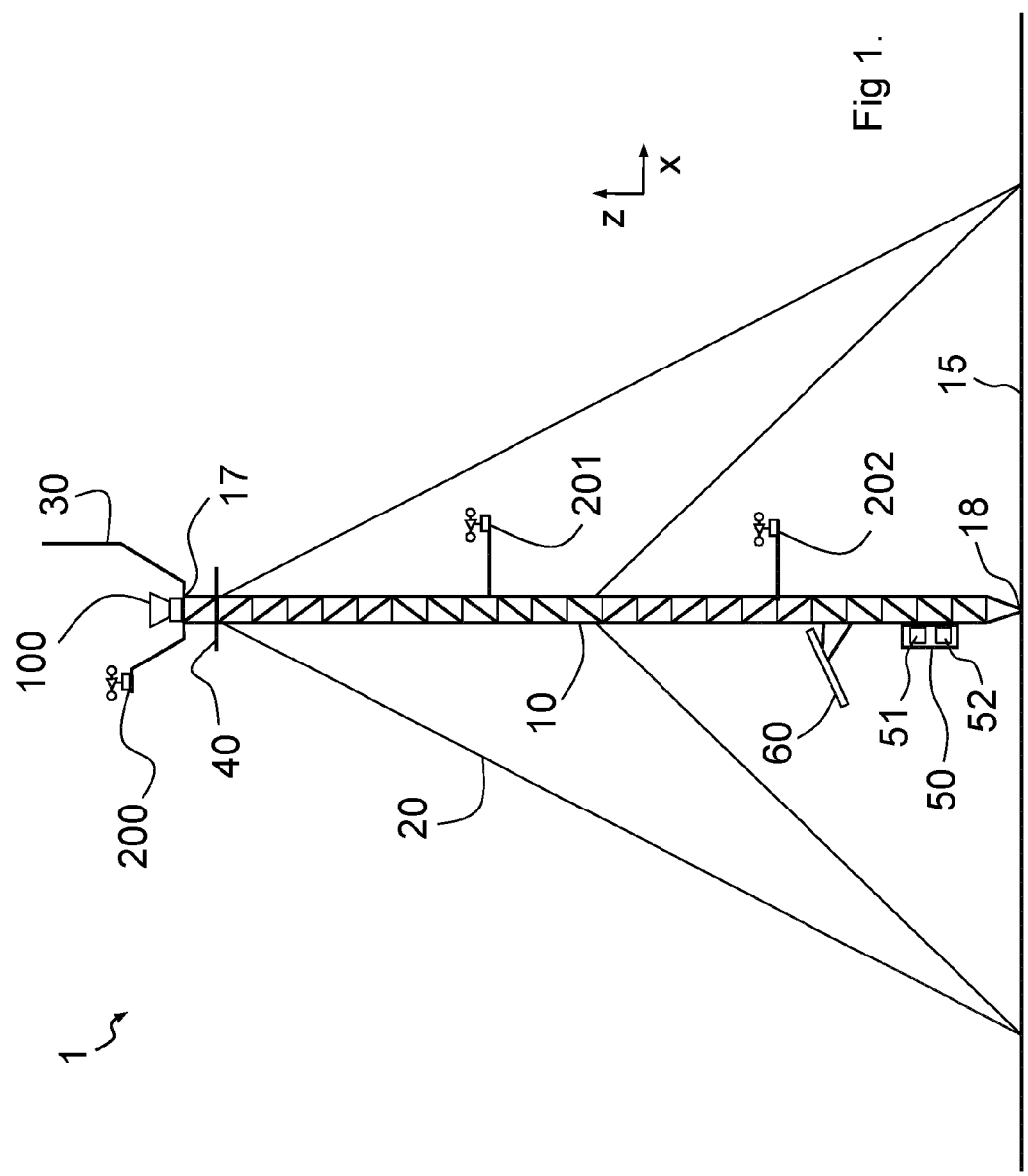

(51) Int. Cl.
*G01S 17/95* (2006.01)
*G01W 1/04* (2006.01)

(56) References Cited

U.S. PATENT DOCUMENTS

| | | | |
|---|---|---|---|
| 2002/0035444 | A1 | 3/2002 | Wilkerson et al. |
| 2006/0179934 | A1* | 8/2006 | Smith et al. ................. 73/170.11 |
| 2009/0100923 | A1* | 4/2009 | Stein ........................... 73/170.01 |
| 2010/0195089 | A1 | 8/2010 | Wu et al. |
| 2011/0137564 | A1* | 6/2011 | Beach et al. ....................... 702/3 |
| 2012/0185414 | A1* | 7/2012 | Pyle et al. ........................ 706/11 |

FOREIGN PATENT DOCUMENTS

| | | |
|---|---|---|
| EP | 2 080 901 A2 | 7/2009 |
| EP | 2 128 438 A2 | 12/2009 |
| GB | 2398841 A | 9/2004 |
| WO | 2009063112 A1 | 5/2009 |

OTHER PUBLICATIONS

International Search Report (in German with English translation) and Written Opinion (in German) for PCT/EP2011/069578, mailed on Apr. 26, 2012; ISA/EP.

International Preliminary Report on Patentability (Chapter I of the Patent Cooperation Treaty) for PCT/EP2011/069578, issued May 21, 2013.

\* cited by examiner

METEOROLOGICAL MEASUREMENT SYSTEM

CROSS-REFERENCE TO RELATED APPLICATIONS

This application is a 371 U.S. National Stage of International Application No. PCT/EP2011/069578, filed Nov. 7, 2011, and claims priority to German Patent Application No. 10 2010 060 663.4 filed Nov. 18, 2010, the disclosures of which are herein incorporated by reference in their entirety.

The invention relates to a meteorological measurement arrangement having at least one meteorological mast which extends from a substrate in an upward direction and which carries one or more wind measurement devices, the or at least one of the wind measurement devices being arranged in the region of the upper mast tip and being constructed as a remote wind measurement device, by means of which wind properties can be measured at one or more remote measurement locations which are located above and with spacing from the remote wind measurement device.

A meteorological mast, by means of which the wind speed and the wind direction can be measured is known from EP 2 128 438 A2.

EP 2 080 901 A2 discloses a method for estimating the properties of the freely flowing wind for a wind turbine which comprises a rotor, the wind speed being estimated at the pod of the wind turbine, at least one angular position of the rotor for measuring the wind properties at the pod being determined from the estimated wind speed and the wind properties at the pod at the previously determined angular position of the rotor then being measured. A meteorological mast can thereby be dispensed with.

DE 10 2004 051 843 A1 discloses a wind turbine having a substructure, a machine housing which is arranged thereon and which can be adjusted in an azimuthal manner by means of a pivot device, a rotor which is rotatably arranged at an end face of the machine housing and which drives a generator for producing electrical energy, measurement devices for measuring wind speed and wind direction, and for an electromechanical quantity, and a control for the pivot device. One of the transmitters is constructed as a cup anemometer and serves to determine the wind strength. Another of the transmitters is constructed as a wind vane and serves to establish the wind direction. The control with the transmitters thereof for the wind speed and the wind direction may be arranged on the machine housing of the wind turbine or on a separate tower.

A meteorological mast is generally used to measure properties of the wind in accordance with the height above a substrate on which the mast stands, the wind properties comprising, for example, the wind speed and the wind direction. For example, wind properties supplied by a meteorological mast are used for the evaluation of the occurrence of wind at a location in order to be able to assess whether this location is suitable for the construction of a wind park. In addition to the wind speed and the wind direction, the wind properties preferably also comprise the vertical wind shear, measurements having shown that the vertical wind shear varies locally and temporally.

The nominal power of wind turbines has been increasing for some time and may nowadays be in the range of several megawatt, wind turbines having such a nominal power also being referred to as multi-megawatt turbines. As the nominal power increases, however, the height of the rotor hub also increases so that the height of the meteorological masts would have to increase in order to be able to establish the wind properties at least at the height of the rotor hub. However, there are currently several reasons for limiting the height of meteorological masts, in particular to a height of 60 m or less. A first reason is that, below a mast height of 60 m, no permission is required from the US Federal Aviation Administration (FAA) for the construction of masts. A second reason is that the costs for meteorological masts significantly increase when the mast heights exceed 80 m or 100 m.

If a meteorological mast having a mast height of 60 m is used to evaluate the occurrence of wind at a height which exceeds 60 m, a mathematical extrapolation of the wind properties supplied by the mast at this height is carried out. However, it is known that such an extrapolation is linked with errors.

Remote wind measurement devices for establishing a remote wind field are known from the prior art. Such remote wind measurement devices are based on the use of the Doppler effect, the frequency displacement between emitted waves and reflected waves being evaluated. Both electromagnetic waves and sound waves can be used. The remote wind measurement devices are arranged at the height of the substrate and emit the waves which are collimated to form a beam in an upward direction. Reflections of the waves at inhomogeneities in the atmosphere lead to a back-scattered signal with the Doppler frequency displacement so that it is possible to determine the wind speed in the direction of the beam axis. The measurements can be carried out at various measurement locations along the beam. Owing to the sensitivity of such measurements with respect to external influences, in particular owing to the possibility of external signals impairing these measurements, in order to evaluate the occurrence of the wind at a location, the wind properties are additionally measured by means of at least one anemometer, which is arranged on a meteorological mast in the region of the remote wind measurement device.

The wave beams emitted form a conical or triangular shape in order to obtain a linearly independent set of speed values which are measured along the beam axes, so that the determination of the wind speed is possible in any direction. Consequently, this measurement is connected with a spatial averaging which involves the addition and subtraction of measurement values which are measured along the beams at different measurement locations. In the event of occurrences of turbulence of the air at the measurement locations, this averaging provides wind properties which differ from wind properties measured by means of an anemometer and a wind vane since, using the anemometer and the wind vane, the wind properties are measured at a single spatial point. The two wind properties can consequently be compared with each other only in a limited manner.

A meteorological measurement arrangement is therefore desired which
- can be produced in a cost-effective manner and transported and installed in a simple manner,
- in particular requires no permission from any Federal Aviation Administration and consequently preferably has a maximum height of less than 60 m,
- can supply the measurement data, which are accurate in relation to standard anemometer measurements, so that the measurement data can be recognised in particular by credit institutes,
- enables measurements of the wind speed at different heights,
- enables measurements at and/or above the hub height of wind turbines, which in particular exceeds 60 m,
- is insensitive with respect to external sources of disruption, and is more secure with respect to theft and vandalism than ground-based measurement systems.

US 2010/0195089 A1 discloses a wind anemometer having a light source for emitting pulsed light, a receiver for receiving light back-scattered at particles conveyed through the air for each light pulse and a processor for determining the location of the particles with respect to the anemometer and for estimating the wind speed using location changes of the particles over at least one period of time. The anemometer may be orientated horizontally so that the pulsed light can be transmitted forwards from the wind turbine. Alternatively, the anemometer may be orientated in a vertical manner so that the pulsed light can be transmitted in an upward direction from the wind turbine. The transmitted light and the received light may travel over a common path or also over separate paths. Owing to the use of a plurality of anemometers, a three-dimensional wind speed can be determined. Furthermore, the anemometer may be arranged on a meteorological mast.

However, the wind speeds provided by the anemometer cannot be verified so that implausible measurements cannot be recognised. This uncertainty has to be taken into account with the anemometer, to the detriment of the measurement precision thereof.

Based on this, an object of the invention is to develop a meteorological measurement arrangement of the type mentioned in the introduction in such a manner that the measurement of wind properties is possible at comparatively low costs, even at relatively great heights, with a relatively high level of precision.

This object is achieved according to the invention with a meteorological measurement arrangement according to claim 1. Preferred developments of the invention are set out in the dependent claims.

The meteorological measurement arrangement according to the invention, in particular for establishing the occurrence of wind, comprises at least one meteorological mast which extends from a substrate in an upward direction and which carries one or more wind measurement devices, the or at least one of the wind measurement devices being arranged in the region of the upper mast tip and being constructed as a remote wind measurement device, by means of which wind properties are measured or can be measured at one or more remote measurement locations which are located above and with spacing from the remote wind measurement device, at least one other of the wind measurement devices being arranged in the region of the upper mast tip in close proximity to the remote wind measurement device and being constructed as a local wind measurement device, by means of which wind properties at the location of this wind measurement device can be measured in the vicinity of the remote wind measurement device.

Using the remote wind measurement device, it is possible to measure the wind properties at heights which are above the mast height. For example, wind properties can be measured at heights of 100 m or more, although the mast height is, for example, only 60 m or less. Since the remote wind measurement device is located in the region of the mast tip and consequently at a relatively high position, in particular is arranged in a state remote from the substrate, a measurement carried out with the remote wind measurement device is also substantially more precise than a conventional remote wind measurement, which is carried out from the level of the substrate. The other wind measurement device is also referred to as a reference wind measurement device. In particular, the wind properties measured by the remote wind measurement device can be evaluated by taking into account the wind properties measured by the reference wind measurement device. For example, a plausibility verification and/or a correction of the wind properties measured by the remote wind measurement device and/or a calibration of the remote wind measurement device and/or the measurements carried out by means of the remote wind measurement device can be carried out. Consequently, the invention affords the possibility of measuring the wind properties at relatively great heights in a relatively precise manner. In particular, using the remote wind measurement device, the wind properties can be measured at one or more heights, which are at and/or above the hub height of a wind turbine. Furthermore, the mast height is preferably at or below 80 m or 100 m so that the cost increase linked with a greater mast height can be prevented. Preferably, the mast height is approximately 60 m and/or below 60 m so that, in the USA, it is not necessary to acquire permission from the Federal Aviation Administration FAA.

The wind properties measured by the remote wind measurement device preferably include the wind speed and/or the wind direction.

The "wind speed" is preferably a vectorial variable with spatial components. Preferably, the wind speed comprises one vertical and two horizontal components. When the wind speed is considered in a vectorial manner, the wind speed consequently also comprises information relating to the wind direction. The vertical component of the wind speed is also referred to as vertical wind speed. Preferably, a horizontal wind speed is further defined which comprises the two horizontal components of the wind speed. However, it is also possible to define a horizontal wind speed which comprises only one of the horizontal components of the wind speed. The latter may be advantageous when only one of the horizontal components of the wind speed is of interest.

Alternatively, it is possible to consider the value of the vectorial wind speed as the "wind speed" (for example, when measuring the wind speed with a cup anemometer). In this case, the wind direction constitutes additional information. Preferably, the vectorial wind speed and/or the vertical wind speed and/or the horizontal wind speed can be formed by the wind direction and the value of the wind speed.

The mast extends from the substrate in particular in a vertical or substantially vertical upward direction. The remote wind measurement device is preferably arranged with vertical spacing above the substrate. Furthermore, by means of the remote wind measurement device, the wind properties are preferably measured with a vertical or substantially vertical spacing with respect to the remote wind measurement device. The remote measurement locations are preferably located above and with spacing from the mast tip.

According to an embodiment of the invention, the remote wind measurement device comprises a LIDAR system or a SODAR system. The term "SODAR" stands for "Sonic Detection and Ranging" and refers to an acoustic remote measurement method. The term "LIDAR" stands for "Light Detection and Ranging" and refers to an optical remote measurement method. These systems are known from the prior art and form a preferred embodiment for the remote wind measurement device. In particular, by means of the remote wind measurement device, the wind properties are established at different heights so that the remote measurement locations are also located at different heights.

The reference wind measurement device is arranged in the region of the upper mast tip and is constructed as a local wind measurement device, by means of which wind properties are measured or can be measured at the location of this wind measurement device. Since both the remote wind measurement device and the reference wind measurement device are located in the region of the upper mast tip, the reference wind measurement device is arranged in close proximity to the remote wind measurement device. Consequently, using the reference wind measurement device, the wind properties can be measured in the vicinity of the remote wind measurement device. In the event of an evaluation of the wind properties measured by the remote wind measurement device, taking into account the wind properties measured by the reference wind measurement device, the actual wind properties at the remote measurement location(s) can be determined with greater precision since the wind properties at the location or in the region of the remote wind measurement device are known. The reference wind measurement device is preferably arranged above the remote wind measurement device. It can consequently be excluded that a measurement carried out by means of the reference wind measurement device is impaired by the remote wind measurement device. Such an impairment may be brought about, for example, in that the reference wind measurement device is located in the lee of the wind of the remote wind measurement device. The wind properties measured by the reference wind measurement device preferably comprise the wind speed and/or the wind direction. Furthermore, these wind properties may also include the air temperature and/or the air pressure.

According to a development of the invention, at least one other of the wind measurement devices is arranged below the remote wind measurement device and is constructed as a local wind measurement device, by means of which wind properties at the location of this wind measurement device are measured or can be measured. The additional wind measurement device is also referred to as a lower wind measurement device. Using the lower wind measurement device, the wind properties can advantageously be measured at a height which is below the hub height of a wind turbine. The wind properties measured by the lower wind measurement device preferably include the wind speed and/or the wind direction. Furthermore, these wind properties may also include the air temperature and/or the air pressure. Advantageously, a plurality of additional or lower wind measurement devices are provided at different heights on the mast. Preferably, the plurality of additional or lower wind measurement devices are each arranged below the remote wind measurement device. In particular, the plurality of additional or lower wind measurement devices are each constructed as local wind measurement devices.

The term "local wind measurement device" is used in particular to refer to a wind measurement device which can measure wind properties at a location at which the local wind measurement device is arranged. These wind properties preferably include the wind speed and/or the wind direction. These wind properties may further also include the air temperature and/or the air pressure. Preferably, each of the local wind measurement devices comprises a wind direction measurement device and/or a wind direction measurement device (wind direction transmitter). The respective wind speed measurement device may comprise, for example, an anemometer, in particular a cup anemometer. Furthermore, the respective wind direction measurement device may comprise, for example, a wind vane. The respective wind speed measurement device and the respective wind direction measurement device may form separate measurement devices. Alternatively, the respective wind speed measurement device and the respective wind direction measurement device may also be formed by a single measurement device which, for example, comprises an ultrasound anemometer. Each of the local wind measurement devices may, as required, further comprise a temperature transmitter and/or a pressure transmitter. The respective pressure transmitter is, for example, formed by a barometer. Furthermore, the respective temperature transmitter is formed, for example, by a thermometer. As already described above, in particular the other wind measurement device and/or the additional wind measurement device(s) is/are constructed as a local wind measurement device.

The other wind measurement device and/or the additional wind measurement device(s) preferably each comprise an anemometer and/or a wind direction transmitter, such as, for example, a wind vane and/or a temperature transmitter and/or a pressure transmitter. With the or with each of the anemometer(s), it is possible to establish in particular the wind speed at the location of the respective wind measurement device. Preferably, with the or with each of the anemometer(s), it is possible to measure both the wind speed and the wind direction at the location of the respective wind measurement device. The or each of the anemometers may consequently comprise a wind direction transmitter. With the or with each of the wind direction transmitter(s), it is possible to establish in particular the direction of the wind at the location of the respective wind measurement device. This is advantageous in particular when the anemometer(s) can only provide the wind speed. With the or with each of the temperature transmitter(s), the temperature of the air at the location of the respective wind measurement device can preferably be measured. With the or with each of the pressure transmitter(s), the air pressure at the location of the respective wind measurement device can advantageously be measured.

According to a development of the invention, the remote wind measurement device is connected to at least one recording device, the wind properties measured by the remote wind measurement device being transmitted in the form of measurement data to the recording device, by means of which the measurement data are recorded, in particular stored. Preferably, the other wind measurement device and/or the additional wind measurement device(s) is/are connected to the recording device, the wind properties measured by the other wind measurement device and/or the additional wind measurement device(s) being transmitted in the form of measurement data to the recording device, by means of which those measurement data are recorded, in particular stored. The recording device is preferably arranged on the mast. In particular, the recording device is carried by the mast.

The wind measurement device(s) may be connected to an external electrical power supply and be supplied with electrical power thereby. The same applies to the recording device. However, the mast preferably carries a solar cell arrangement by means of which the wind measurement device(s) can be supplied with electrical power. Consequently, it is possible to also operate the meteorological measurement arrangement when there is no external power supply. According to a development of the invention, the mast carries a battery arrangement by means of which the wind measurement device(s) can be supplied with electrical power. An independence from an external power supply can also be achieved thereby. Advantageously, the battery arrangement is electrically connected to the solar cell arrangement and can be electrically charged thereby. Preferably, the battery arrangement comprises one or more chargeable batteries or accumulators.

The substrate is preferably formed by the ground. The mast preferably stands on the substrate. Furthermore, the mast may stand on a foundation and/or be connected to the ground by means of the foundation. Advantageously, the mast is a tiltable mast, which is constructed in particular by means of upward pivoting so that it can be completely preassembled in the horizontal state. The mast is preferably retained by means of a plurality of retention cables, which are secured both to the mast and to the substrate. The mast may be constructed as a lattice-like construction or in a tubular manner. In particular, the end of the mast facing away from the substrate forms the mast tip. The mast preferably forms an elongate member whose particular direction is directed upwards from the substrate, in particular in a vertical or substantially vertical direction. The mast is preferably a stationary mast. The term "stationary" refers in particular to a measurement time period in which the wind properties are measured by means of the wind measurement device(s) so that the mast is stationary during or at least during the measurement of the wind properties using the wind measurement device(s). In particular, the mast forms neither a wind turbine, nor a portion of a wind turbine. However, the mast may be provided in addition to and/or alongside one or more wind turbines. In particular, the meteorological mast is consequently a mast which is external with respect to the wind turbine.

The meteorological measurement arrangement according to the invention is preferably a stationary measurement arrangement. The term "stationary" in particular refers to a measurement time period in which the wind properties are measured by means of the wind measurement device(s) so that the measurement arrangement is stationary during or at least during the measurement of the wind properties using the wind measurement device(s). The measurement arrangement according to the invention is preferably a measurement arrangement which is external with respect to the wind turbine.

According to a development of the invention, there is provided a compensation device, by means of which movements of the mast tip relative to the substrate can be detected. Such movements may be brought about, for example, by means of wind which acts on the mast. The movements of the mast tip lead to movements of the remote wind measurement device relative to the substrate, whereby the wind properties measured by the remote wind measurement device can be influenced and/or distorted. Using the compensation device, such influences and/or distortions of the wind properties measured by the remote wind measurement device can preferably be compensated for. The compensation device is in particular arranged in the region of the upper mast tip and is preferably securely connected to the mast. Advantageously, the compensation device is coupled to the remote wind measurement device and/or to an evaluation unit which is connected thereto and/or integrated therein. The compensation device comprises in particular at least one movement measurement device which is arranged in the region of the upper mast tip and which is constructed, for example, as an acceleration measurement device or as a camera.

Using the camera, it is possible to detect, for example, movements of the mast tip relative to a reference location provided on the substrate and/or reference object.

According to an embodiment of the invention, the remote wind measurement device comprises a wave receiver and a wave transmitter, by means of which waves are or can be transmitted into the atmosphere, at least a portion of which is scattered and/or reflected in the atmosphere. At least a portion of the scattered and/or reflected waves is preferably received by the wave receiver. The wave transmitter and the wave receiver are in particular arranged in close proximity to one another. The wave transmitter and the wave receiver are preferably combined to form a transmission/receiving unit. The waves are preferably electromagnetic waves or sound waves. Consequently, the remote wind measurement device comprises or forms in particular a LIDAR system or a SODAR system. The waves are preferably transmitted by the wave transmitter in a vertical direction or upwards in a direction inclined with respect to the vertical direction. The waves transmitted by the transmitter are in particular scattered and/or reflected at inhomogeneities present in the air, for example, on particles carried by the air. The inhomogeneities or particles are excited by the waves and thereby themselves become the radiation source. If the inhomogeneities or particles move together with the air relative to the wave receiver, the waves which are received thereby and which have been scattered and/or reflected by the particles, owing to the Doppler effect, have a different frequency from the waves transmitted by the transmitter, the frequency difference (Doppler frequency displacement) between the transmitted and received waves describing the speed of the inhomogeneities or particles relative to the wave receiver and consequently characterising the wind speed at the location of the inhomogeneities or particles. In particular, the waves transmitted by the transmitter are scattered and/or reflected in one or more volume ranges of the atmosphere located above the remote wind measurement device, the volume range(s) each forming one of the remote measurement locations. The height of the remote measurement locations can preferably be adjusted and/or varied by means of the remote wind measurement device.

Preferably, the waves are collimated by the transmitter to form one or more beams. According to an embodiment of the invention, the beams are transmitted upwards by the transmitter in different directions inclined with respect to the vertical direction so that the beams together define a geometry which tapers in particular in the direction towards the mast. The geometry is preferably conical or triangular. The aperture angle of the geometry is, for example, between 20° and 30° in the case of sound waves and between 50° and 60° in the case of electromagnetic waves. The geometry formed by the beams is preferably symmetrical relative to the vertical direction. In the case of a SODAR system, such a measurement may also be referred to as a monostatic measurement. Preferably, measurement values obtained from waves received by the receiver and scattered and/or reflected by means of volume ranges or remote measurement locations which are located on different beams and which have the same vertical spacing with respect to the remote wind measurement device are each associated with a group by an evaluation unit which is connected to or integrated in the remote wind measurement device and/or in each case evaluated to form a horizontal wind speed and a vertical wind speed. Each of these groups consequently comprises a plurality of measurement values from a plurality of remote measurement locations or volume ranges which are horizontally spaced apart from each other and which have the same vertical spacing with respect to the remote wind measurement device. A vertical wind speed and a horizontal wind speed can thereby be obtained in particular for each group. Using the remote wind measurement device, consequently, it is possible to preferably establish both the vertical component of the wind speed and the horizontal component of the wind speed at the or at each of the remote measurement locations.

According to a development of the invention, there is provided a second meteorological mast which extends in an upward direction from the substrate and which is spaced apart from the (first) meteorological mast and which carries at least one wave receiver (second wave receiver) which is arranged in the region of the upper mast tip thereof and by means of which at least a portion of the scattered and/or reflected waves is received. The masts are preferably spaced apart from each other in a horizontal direction. In particular, the second mast extends upwards from the substrate in a vertical direction. Consequently, the wind speed and the wind direction can preferably be detected in a limited vertical layer. In particular, the waves emitted by the transmitter are collimated, preferably by means of the transmitter, to form a single beam which is discharged vertically upwards. In the case of a SODAR system, such a measurement may also be referred to as a bistatic measurement. It is further possible with the wave receiver of the remote wind measurement device (first wave receiver) to carry out a monostatic measurement and additionally carry out a bistatic measurement with the second wave receiver.

According to a development of the invention, the second mast carries a remote wind measurement device (second remote wind measurement device) which comprises the second wave receiver and preferably also a wave transmitter (second wave transmitter). In particular, the second remote wind measurement device is arranged in the region of the upper mast tip of the second mast. Preferably, by means of the second wave transmitter, in particular in a vertical or in a substantially vertical direction, waves are transmitted into the atmosphere, at least a portion of which is scattered and/or reflected in the atmosphere. Advantageously, at least a portion of the scattered and/or reflected waves of the second wave transmitter is received by means of the second wave receiver. Preferably, at least a portion of the scattered and/or reflected waves of the second wave transmitter is received by means of the first wave receiver. Preferably, at least a portion of the scattered and/or reflected waves of the second wave transmitter is received by means of the wave receiver. The wave transmitters may transmit at the same time or alternately. Advantageously, the second remote wind measurement device is constructed in the form of a LIDAR system or SODAR system. It is consequently possible to carry out a monostatic measurement with each of the remote wind measurement devices. Additionally or alternatively, it is possible to carry out a bistatic measurement with each of the remote wind measurement devices in combination with the other remote wind measurement device. The measurement precision of the meteorological measurement arrangement according to the invention can thereby be further increased. The masts are preferably constructed so as to be identical.

According to a development of the invention, the remote wind measurement devices emit waves of different frequency so that the frequency of the waves emitted by one of the remote wind measurement devices differs from the frequency of the waves emitted by another of the remote wind measurement devices. Better separation of the signals is thereby possible. Preferably, the frequency difference between the waves transmitted is greater than twice the maximum anticipated Doppler frequency displacement of the scattered and/or reflected waves. Furthermore, the waves are preferably emitted from the remote wind measurement devices in a temporally pulsed manner. Preferably, at least at the beginning of each wave pulse (also referred to here as the wave packet), a synchronisation signal is transmitted from each of the remote wind measurement devices to the other remote wind measurement device, respectively, which subsequently preferably measures the period of time until the arrival of the respective associated scattered and/or reflected wave pulse. Advantageously, a synchronisation signal is also transmitted from each of the remote wind measurement devices to the other remote wind measurement device at the end of each wave pulse, respectively.

The invention further relates to the use of at least one meteorological measurement arrangement according to the invention for establishing the occurrence of the wind and/or the wind conditions at or in a location or area which is in particular free from wind turbines, and at or in which, after the beginning or the completion of the establishment of the occurrence of the wind, one or more wind turbines is/are constructed. The use according to the invention may be developed in accordance with all the embodiments explained in connection with the meteorological measurement arrangement according to the invention.

However, the meteorological measurement arrangement according to the invention may also be used in an existing wind park in order to monitor the occurrence of the wind and/or the wind conditions. The invention consequently further relates to a wind park having a plurality of wind turbines and at least one meteorological measurement arrangement according to the invention. The wind park according to the invention may be developed in accordance with all the embodiments explained in connection with the meteorological measurement arrangement according to the invention.

Figure 2:
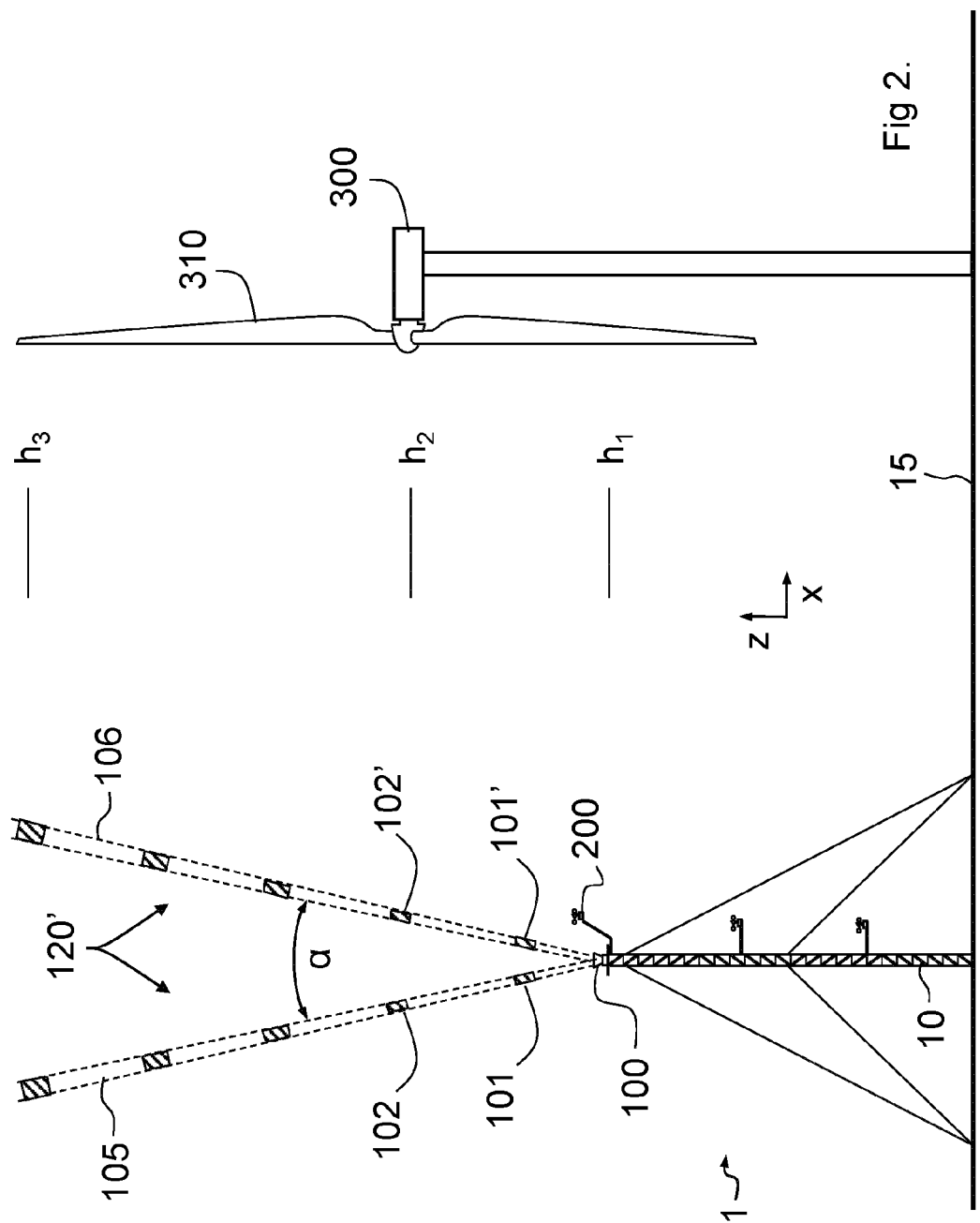
Figure 3:
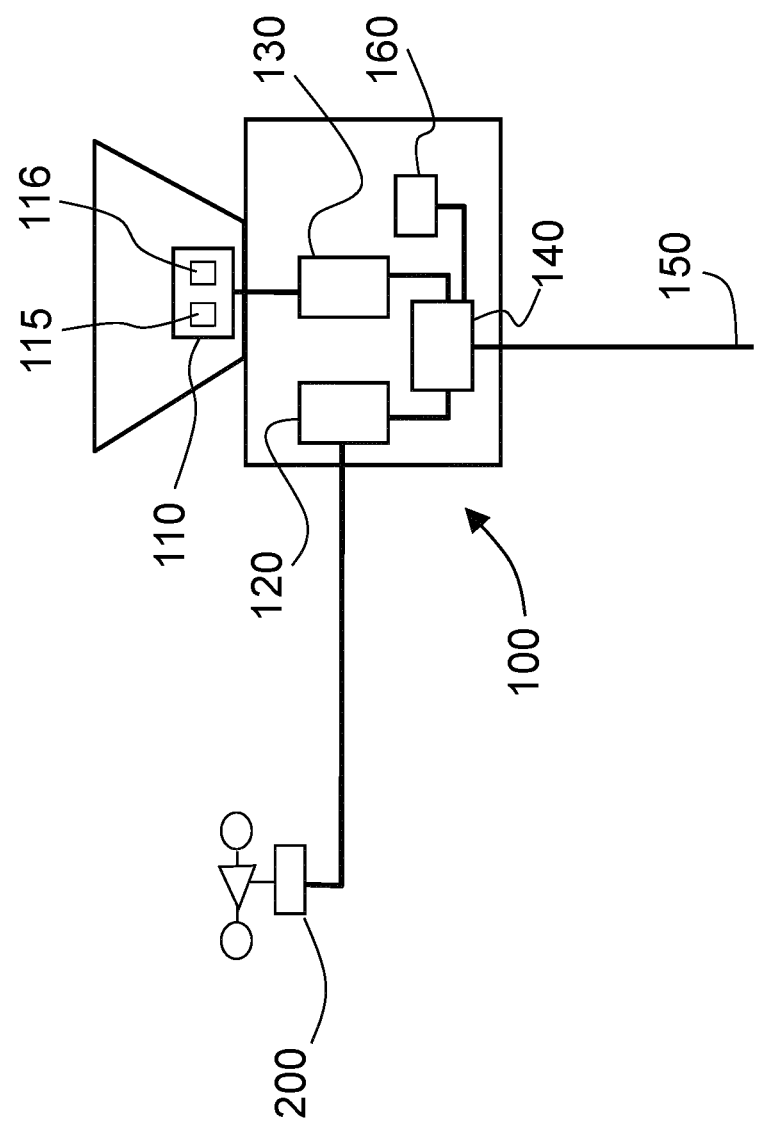
Figure 4:
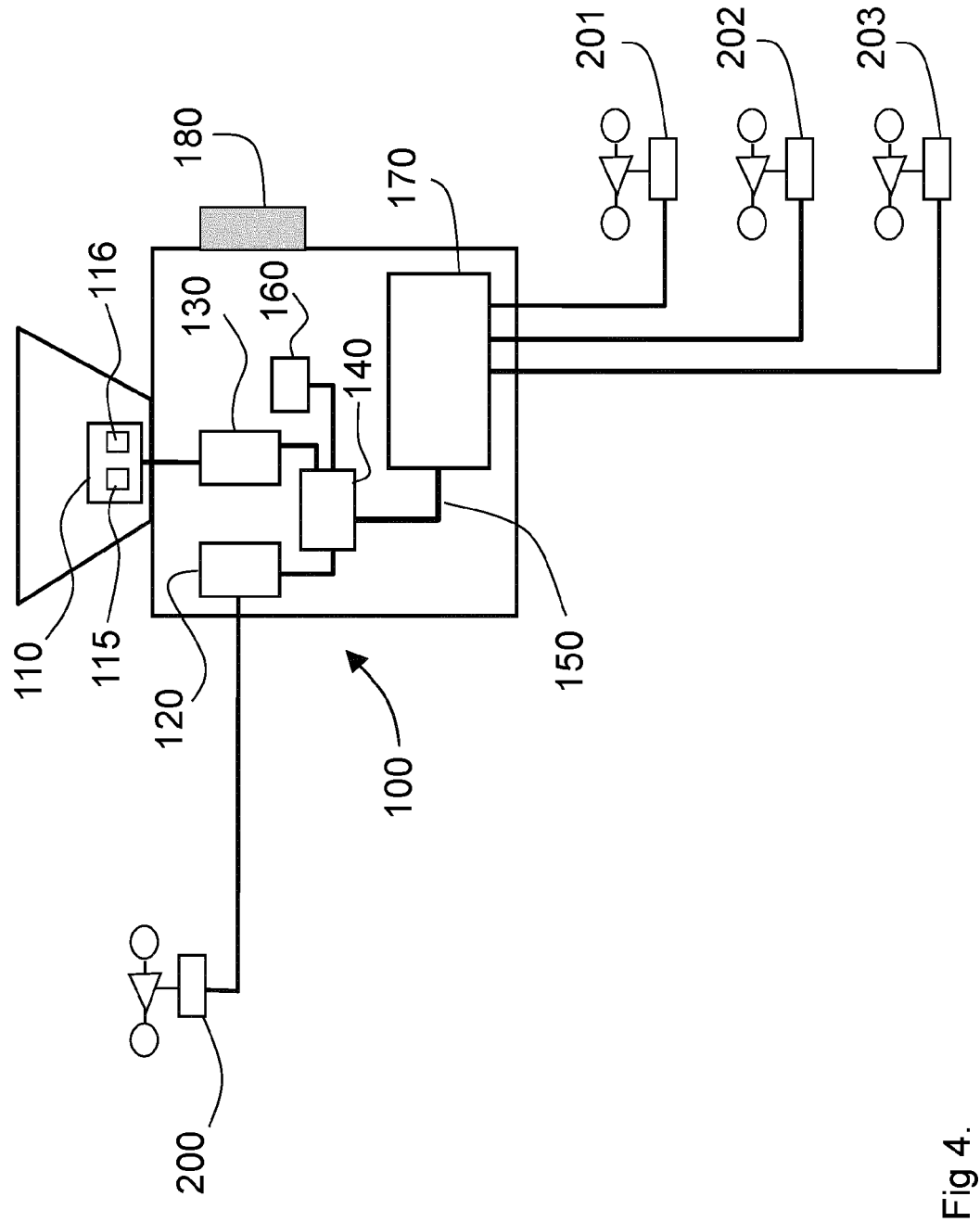
Figure 5:
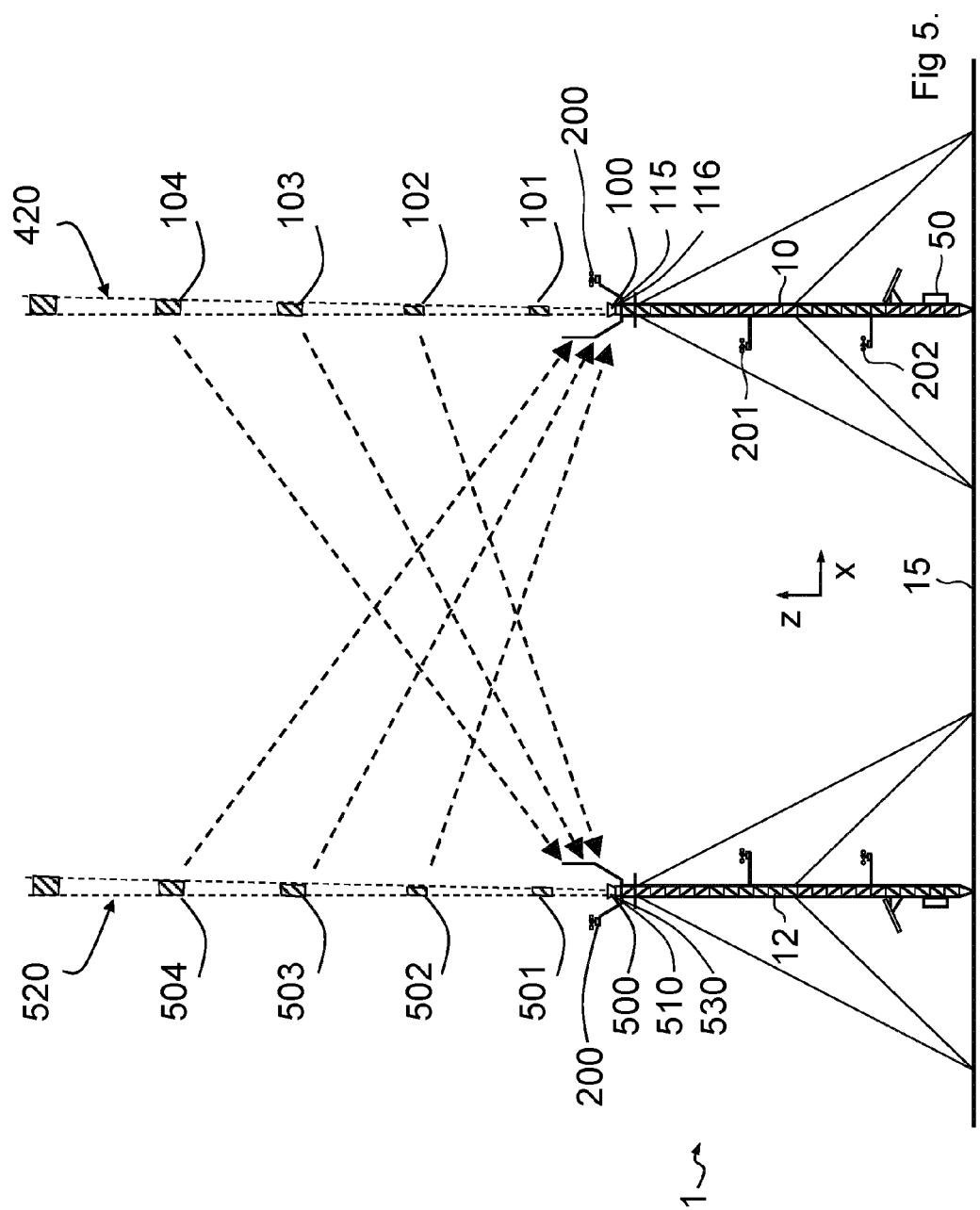

The invention is described below with reference to preferred embodiments and the drawings, in which:

FIG. 1 is a schematic illustration of a meteorological measurement arrangement according to a first embodiment of the invention, FIG. 2 is another schematic illustration of the measurement arrangement according to the first embodiment and a wind turbine, FIG. 3 is a schematic illustration of the remote wind measurement device according to the first embodiment, FIG. 4 is a schematic illustration of a remote wind measurement device of a meteorological measurement arrangement according to a second embodiment of the invention, and FIG. 5 is a schematic illustration of a meteorological measurement arrangement according to a third embodiment of the invention.

In FIGS. 1 to 3, different views and partial views of a meteorological measurement arrangement 1 according to a first embodiment of the invention can be seen, a meteorological mast 10 standing on a substrate 15 which is formed by the ground and extending upwards therefrom in a vertical direction z. The mast 10 is retained in its vertical position by means of retention cables 29 which are secured both to the mast 10 and to the substrate 15. Furthermore, the mast 10 is constructed in a lattice-like manner. Alternatively, however, the mast 10 may also be constructed in a tubular manner. The mast 10 is in particular a tiltable mast, which is constructed by being pivoted upwards into the position which can be seen in FIG. 1, which is preferably carried out with the assistance of a suitable lifting mechanism. The overall height of the mast 10 is in particular below 60 m.

There are positioned on the mast 10, at different heights, local wind measurement devices 201 and 202, which each measure the wind speed and the wind direction at the respective location thereof and are referred to as lower wind measurement devices. Furthermore, in the region of the upper mast tip 17 facing away from the substrate 15, a remote wind measurement device 100 is arranged and secured to the mast 10. The remote wind measurement device 100 transmits waves into the air (or into a fluid or into another medium), the waves being collimated to form beams. These waves are scattered and/or reflected on inhomogeneities in the air (or in the fluid) so that at least a portion of the scattered and/or reflected waves returns to the remote wind measurement device 100, which waves are received thereby. By means of evaluation of the Doppler frequency displacement of the back-scattered and/or back-reflected waves, the remote wind measurement device 100 determines the air speed (or fluid speed) at the location of the scattering and/or reflection (measurement location). The waves may be electromagnetic waves or sound waves, the remote wind measurement device 100 forming a SODAR system in the case of sound waves. In the case of electromagnetic waves, the remote wind measurement device 100 forms a LIDAR system.

The measurement arrangement further comprises a local wind measurement device 200 which is arranged in the region of the mast tip 17 close to the wind measurement device 100 and is secured to the mast 10, and which measures the wind speed and the wind direction at the location thereof and which is referred to as a reference wind measurement device. The reference wind measurement device 200 is arranged above the remote wind measurement device 100 so that measurements carried out by means of the reference wind measurement device 200 are not impaired by means of turbulent flows or turbulence produced by means of the remote wind measurement device 100. The reference wind measurement device 200 provides reference values for the wind speed and the wind direction in the vicinity of the remote wind measurement device 100 so that these reference values are used to calibrate the measurements carried out by means of the remote wind measurement device 100.

If the remote wind measurement device 100 is constructed as a SODAR system, a sound reflector 40 is secured to the mast 10. The sound reflector 40 is preferably located in a position between the remote wind measurement device 100 and the mast-side securing locations of the retention cables 20 so that it forms a sound shield for the remote wind measurement device 100 against sound which may be produced by the retention cables 20 in conjunction with the wind.

There is further secured to the mast 10 a lightning conductor 30 which extends upwards beyond the remote wind measurement device 100 so that the measurement arrangement 1 can be protected against lightning strikes.

In the vicinity of the substrate 15, there is secured to the mast 10 a solar cell arrangement 60 which provides electrical power in order to operate the measurement arrangement 1. This is particularly advantageous at locations at which no external power supply is available. Furthermore, there is secured to the mast 10 a switch cabinet 50 which comprises batteries 51 and/or other devices for storing electrical energy so that uninterrupted power supply for the local wind measurement devices 200, 201 and 202 and/or the remote wind measurement device 100 and/or other electrical devices of the mast 10 can be ensured (for example, at night). The switch cabinet 50 further comprises a recording device 52 for recording the measured values for the wind speeds and wind directions which are measured by all the wind measurement devices 100, 200, 201 and 202 of the mast 10. The recording device 52 is also referred to as the first data recording device.

As can be seen from FIG. 2, the remote wind measurement device 100 emits waves along beams 105 and 106 which describe a conical or triangular geometry 120' whose aperture angle α is typically between 20° and 30° with a SODAR system and between 50° and 60° with a LIDAR system. The measurements are carried out in volume ranges 101, 101', 102 and 102' which are arranged along the beams 105 and 106. Since a measurement of the wind speed is carried out only along the beam direction of the respective beam, several measurements are carried out, preferably at the same height, and provide the wind speed in the horizontal direction x and the wind speed in the vertical direction y. To this end, there are functionally combined to form a group the volume ranges of the beams 105 and 106 which preferably have the same or substantially the same spacing along the beams 105 and 106 with respect to the remote wind measurement device 100, such as, for example, the volume ranges 101 and 101'. The horizontal spacing increases between the volume ranges of the groups with increasing spacing with respect to the remote wind measurement device 100. As this spacing increases, the precision of the horizontal and vertical wind speeds derived may decrease owing to occurrences of wind turbulence. In particular, such occurrences of turbulence may reduce the correlation between the values measured in the volume ranges. However, these problems may be overcome by means of long-term sampling and averaging.

With conventional remote wind measurement devices, which are arranged at the height of the substrate 15, the horizontal spacing between the volume ranges prevents a "clean" and direct comparison of the wind speed derived from the remote wind measurement device with a wind speed which is measured in a single spatial location by means of a local wind measurement device. According to the invention, owing to the proximity of the remote wind measurement device 100 with respect to the reference wind measurement device 200, this obstacle is overcome, which can be particularly attributed to two reasons. Firstly, the spacing between the reference wind measurement device 200 and the lowest group of volume ranges 101 and 101' is small. Secondly, the horizontal spacing between the volume ranges 101 and 101' of the lowest group is small owing to its proximity with respect to the remote wind measurement device 100. Consequently, there is a close correlation between the measurement values provided by the remote wind measurement device 100 and the measurement values provided by a local wind measurement device so that the measurement values provided by the remote wind measurement device 100 have a higher level of acceptability. In particular, the measurement values provided by the remote wind measurement device 100 are suitable for the evaluation of the occurrence of wind at the location of the measurement arrangement 1 and can consequently be considered to be accurate and valid by persons responsible for the evaluation of the occurrence of wind and accreditation institutes.

A modern multi-megawatt wind turbine is schematically illustrated in FIG. 2 and designated 300. Such a wind turbine has a hub height h2 in the range from 80 m to 100 m above the substrate 15. Since the costs for meteorological masts having mast heights of 80 m or more increase considerably, such high masts are unpopular. Although it is known from the prior art to carry out wind measurements at heights below h2 and to extrapolate the measurement values obtained to greater heights, this extrapolation leads to uncertainties and errors with the estimated values for the wind speed and the wind direction. According to the invention, these uncertainties and errors are thereby prevented or at least substantially reduced by the remote wind measurement device 100 being arranged at a height which corresponds or at least substantially corresponds to the mast height h1. Consequently, more precise measurements of the wind speed and the wind direction are possible at the height h2. Furthermore, more precise measurements of the wind speed and the wind direction are also possible at the height h3 which characterises the upper end of the rotor 310 of the wind turbine 300. In addition, the mast 10 may be kept below a height from which permission of the US Federal Aviation Administration FAA is required.

The arrangement of the remote wind measurement device 100 at the tip 17 of the mast 10 reduces the spacing of the remote wind measurement device 100 with respect to the volume range which is furthest away and which is used for a measurement. Consequently, the radiation capacity of the remote wind measurement device 100 can also be reduced so that it can be constructed so as to have less power and/or so as to be smaller than a SODAR or LIDAR system which is arranged on the substrate 15. If the remote wind measurement device 100 is constructed as a SODAR system, the reduced spacing with respect to the volume ranges further enables a higher operating frequency so that the geometric dimensions of the remote wind measurement device (owing to the smaller acoustic wavelength) can be reduced and the influence of background interferences (owing to the higher frequency) can be reduced. The latter leads in particular to a better signal-to-noise ratio. In addition, the arrangement of the remote wind measurement device 100 on the mast tip 17 increases the spacing between the remote wind measurement device 100 and sources of background noises present at the substrate level. Another advantage of the spacing of the remote wind measurement device 100 with respect to the substrate 15 is the increased security with respect to theft and vandalism.

FIG. 3 is a schematic view of the remote wind measurement device 100 which has a transmission and receiving unit 110 by means of which waves can be produced and received. There is further provided an evaluation unit 130 by means of which measurement data established from the back-scattered waves are formed into a first wind speed and direction for each group of volume ranges. An evaluation unit 120 receives the signals provided by the reference wind measurement device 200 and forms them into a second wind speed and direction, a comparison and adjustment unit 140 being provided by means of which the first wind speed and direction, which is associated with the lowest group of volume ranges 101 and 101', is compared with the second wind speed and direction. Furthermore, the comparison and adjustment unit 140 may modify or correct the wind speed and direction for all groups of volume ranges on the basis of this comparison. Furthermore, the remote wind measurement device 100 comprises an acceleration measurement device 160, by means of which in particular a movement of the mast 10 or the mast tip 17 can be established. The acceleration measurement device 160 is used to compensate for disruptive influences which influence the wind measurements carried out by the remote wind measurement device 100 and which are brought about by movements of the mast 10. In addition or as an alternative to the acceleration measurement device 160, the current orientation and speed of the remote wind measurement device 100 can be established by means of a camera, which is arranged in or in the proximity of the remote wind measurement device 100 and which is focused on a predetermined reflector or on another predetermined optical target close to the mast base 18. The orientation and speed of the remote wind measurement device 100 can consequently be established by means of a movement of the image of the reflector or target on the light-sensitive plane of the camera. The camera is in particular an optical digital camera. Using the camera, a movement of the mast 10 can consequently be established.

The values measured by means of the remote wind measurement device 100 and preferably also by means of the reference wind measurement device 200 are supplied to the first data recording device 52 by means of a communication line 150. These measured values represent in particular information relating to the wind field above the remote wind measurement device 100.

FIG. 4 is a schematic view of a remote wind measurement device 100 of a meteorological measurement arrangement according to a second embodiment of the invention, features which are identical or similar to the first embodiment being given the same reference numerals as in the first embodiment. In particular, the remote wind measurement device according to FIG. 4 may replace the remote wind measurement device according to FIG. 3. The remote wind measurement device 100 comprises a second evaluation unit 170, by means of which measurement data supplied via the communication line 150 are collected from the remote wind measurement device 100 and stored. Furthermore, measurement data can be collected and stored from other wind measurement devices 201, 202, 203, etc., which are arranged at various locations of the mast 10 and which are each preferably constructed as local wind measurement devices. The measured data may be both stored locally and transmitted to an external receiver, for example, by means of a wireless communication system. The remote wind measurement device 100 further comprises a light signal transmitter 180 which may be required for legal reasons. The advantage of the integration of the data storage and/or the light signal transmitter 180 in the remote wind measurement device 100 in particular involves the consolidation and common use of common systems in a single unit so that redundancies and costs can be reduced. Examples of such common systems are, for example, temperature controllers for operation in cold or warm weather, direct-current voltage sources, wireless communication systems, internal temperature and humidity sensors, lightning protection switches and the external protective housing. As an additional advantage, there may be provided in the evaluation unit 170 a monitoring system by means of which the operating state and/or the functional state of the remote wind measurement device 100—and preferably the local wind measurement devices—can be monitored and can be transmitted to the or an external receiver in the form of a report. Preferably, the monitoring system may interrogate the operating state of each component, including each wind measurement device, and the sub-components of the remote wind measurement device 100 and provide a report relating to the operating state of the entire mast system to the external receiver. This report may be carried out, for example, by means of the wireless communication system. For further description of the second embodiment, reference is made to the description of the first embodiment.

In the previous embodiments, the scattering operation produces reflected waves, which propagate from the location of the scattering in several directions. The remote wind measurement device 100 comprises a wave transmitter 115 and a wave receiver 116, which is arranged in close proximity to the wave transmitter 115, both the transmitter 115 and the receiver 116 being arranged in the remote wind measurement device 100. Owing to this proximity, the remote wind measurement device 100 operates with signals which are back-scattered from atmospheric inhomogeneities so that the receiver 116 in particular receives only those scattered waves which extend in one direction, which is opposed or substantially opposed to the radiation direction of the waves transmitted by means of the transmitter 115. In the case of sound waves, such a remote wind measurement device is known as a monostatic SODAR system.

However, it is also possible to carry out a measurement on the basis of waves which are scattered in an oblique manner. Waves which are scattered in an oblique manner are intended to be defined as waves which are scattered in a direction which deviates from the 180° direction of the back-scattered waves. In the case of waves which are scattered in an oblique manner, the wave transmitter and the wave receiver are arranged at different spatial positions, which is known from the prior art as a bistatic system. The use of waves which are scattered in an oblique manner affords in particular the two following advantages: on the one hand, the scattered signal strength is substantially higher than with back-scattered waves, since the sound waves which are scattered in an oblique manner are produced in particular by energetically vertical (that is to say, speed-based) turbulence movements, whereas the back-scattered sound waves are produced in particular only by the weaker density disturbances within the turbulence field. On the other hand, in place of the beams 105 and 106 which form the conical or triangular geometry 120, a single vertical beam 420 can be used so that measurements at substantially point-like measurement locations 101 and 102, etc., can be carried out along the beam 420 at different heights (see FIG. 5). The single beam 420 defines a narrow geometry in particular with respect to the geometry 120.

FIG. 5 is a schematic view of a meteorological measurement arrangement 1 according to a third embodiment of the invention, features which are identical or similar to the previous embodiments being given the same reference numerals as in the previous embodiments. According to the third embodiment, the concept of a bistatic system having a single wave transmitter is expanded to a new multistatic system which comprises two or more wave transmitters. A remote wind measurement device 100 which is arranged in the region of the mast tip of a first meteorological mast 10 comprises a first wave receiver 116 and a first wave transmitter 115 which produces a first wave beam 420. The first beam 420 extends in particular upwards in a vertical direction z. A second remote wind measurement device 500 which is arranged in the region of the mast tip of a second meteorological mast 12 comprises a second wave receiver 530 and a second wave transmitter 510 which produces a second beam 520. The second beam 520 extends in particular upwards in a vertical direction z. Waves which are emitted by the first wave transmitter 155 and which are scattered by means of atmospheric inhomogeneities along the first beam 420 at locations 101, 102, etc., are received both by the first wave receiver 116 as back-scattered waves and by the second wave receiver 530 as waves which are scattered in an oblique manner. At the same time, waves which are emitted by the second wave transmitter 510 and which are scattered by means of atmospheric inhomogeneities along the second beam 520 at locations 501, 502, etc., are received both by the second wave receiver 530 as back-scattered waves and by the first wave receiver 116 as waves which are scattered in an oblique manner. In order to associate a specific spatial location along the wave beam with each of the signals which are scattered in an oblique manner, the following measures are in particular implemented:

1. The process of the wave production by means of the first and the second wave transmitter 115 and 510 is carried out in a temporally pulsed manner so that wave packets with a limited spatial expansion are produced, which are propagated in the direction of the respective wave beam 420 or 520.

2. At the beginning and at the end of the respective wave packet production, a synchronisation signal is in each case transmitted from the respective wave transmitter to the other wave receiver (that is to say, the wave transmitter 115 transmits a synchronisation signal to the wave receiver 530 and the wave transmitter 510 transmits a synchronisation signal to the wave receiver 116). The synchronisation signal is preferably transmitted in the form of electromagnetic waves.

3. The period of time between the respective synchronisation signal and the arrival of the scattered wave signals is measured and used to calculate the spatial position (measurement location) along the respective beam, from which the scattered signal originates.

In order to make it easier for the wave receiver 116 to differentiate between signals back-scattered from the beam 420 and wave signals scattered in an oblique manner by the beam 520, there is preferably selected for the frequency of the waves of the beam 520 a frequency which differs from the frequency of the waves of the beam 420 by a value which is in particular greater than twice the Doppler frequency displacement, which is anticipated as a maximum for the measurement operation. This frequency separation prevents a frequency overlap of scattered signals of the beam 420 and the beam 520. If three or more beams are used, the frequency of each beam is preferably selected in such a manner that no frequency overlap can occur between all the scattered signals. Apart from this, the two masts 10 and 12 are preferably constructed in an identical manner. For further description of the third embodiment, reference is made to the description of the previous embodiments.

Finally, it should be mentioned that a multistatic system using three beams which are located at the corners of a triangle enables the measurement of the Doppler frequency displacement in two independent horizontal directions so that the measurement of all three spatial components of the wind speed is possible. The beams preferably each extend in a vertical direction.

The invention claimed is:

1. A meteorological measurement system comprising:
a meteorological mast extending from a substrate in an upward direction;
a first wind measurement device arranged in an upper mast tip region of the mast and operable to act as a remote wind measurement device for measuring wind properties at one or more remote measurement locations in spaced relation to the remote wind measurement device, the measuring being accomplished by:
the first wind measurement device transmitting a conically radiating signal radiating upwardly away from the upper mast tip region; and
the first wind measurement device receiving at least a reflected portion of the conically radiating signal due to inhomogeneities in air above the first wind measurement device and above the upper mast tip region, at the one or more remote measurement locations;
a second wind measurement device arranged in the upper mast tip region proximate to the remote wind measurement device and operable to act as a local wind measurement device for measuring wind properties at a location of the local wind measurement device and in the vicinity of the remote wind measurement device; and
wherein the one or more remote measurement locations is defined by at least one volume area at a predetermined distance elevationally above the first wind measurement device, and bounded by the conically radiating signal.

2. The meteorological measurement system according to claim 1, wherein the remote wind measurement device is selected from the group consisting of a LIDAR system, a SODAR system or combinations thereof.

3. The meteorological measurement system according to claim 1, wherein the one or more remote measurement locations comprise a plurality of measurement locations defined by a corresponding plurality of volume areas, with each said one of the volume areas being located at a different height with respect to the location of the remote wind measurement device.

4. The meteorological measurement system according to claim 1, wherein the local wind measurement device provides reference values for wind speed and wind direction in proximity to the remote wind measurement device for calibrating measurements from the remote wind measurement device.

5. The meteorological measurement system according to claim 1, wherein the local wind measurement device is arranged above the remote wind measurement device.

6. The meteorological measurement system according to claim 1, wherein the local wind measurement device is arranged below the remote wind measurement device.

7. The meteorological measurement system according to claim 1, wherein each of the remote and local wind measurement devices is selected from the group consisting of an anemometer, a wind direction indicator or combinations thereof.

8. The meteorological measurement system according to claim 1, wherein the remote wind measurement device is connected to at least one recording device, the wind properties measured by the remote wind measurement device being communicated and stored to the recording device as measurement data.

9. The meteorological measurement system according to claim 8, wherein the local wind measurement device is connected to the at least one recording device, the wind properties measured by the local wind measurement device being communicated and stored to the recording device in a form of additional measurement data.

10. The meteorological measurement system according to claim 9, wherein the mast carries the at least one recording device.

11. The meteorological measurement system according to claim 1, further comprising a solar cell arrangement carried by the mast and electrically coupled to at least one of the remote and local wind measurement devices for supplying electrical power thereto.

12. The meteorological measurement system according to claim 11, further comprising a battery arrangement electrically connected to the solar cell arrangement for electrical charging of the battery arrangement.

13. The meteorological measurement system according to claim 1 further comprising a battery arrangement carried by the mast and electrically connected to at least one of the remote and local wind measurement devices for supplying electrical power thereto.

14. The meteorological measurement system according to claim 1, wherein the substrate is formed by the ground.

15. The meteorological measurement system according to claim 14, wherein the mast comprises a mast tiltably postionable with respect to the ground.

16. The meteorological measurement system according to claim 1, further comprising a plurality of retention cables secured between the mast and the substrate.

17. The meteorological measurement system according to claim 1, wherein the remote measurement device further comprises a wave transmitter for transmitting the conically radiating signal, wherein at least a portion of the conically radiating signal is scattered or reflected in the atmosphere.

18. The meteorological measurement system according to claim 17, wherein the remote measurement device further comprises a wave receiver configured to receive at least a portion of the reflected conically radiating signal transmitted from the wave transmitter.

19. The meteorological measurement system according to claim 18, wherein the conically radiating signal transmitted from the wave transmitter comprises a collimated signal which forms a plurality of beams which are transmitted in different directions inclined with respect to a vertical direction, and which originate proximate to the mast upper end, and which together define a conical geometry which tapers in a direction towards the mast upper end.

20. The meteorological measurement system according to claim 19, further comprising an evaluation unit operably connected to the remote wind measurement device, and wherein measurement values obtained from the reflected portion of the conically radiating signal received by the wave receiver and scattered or reflected by means of remote measurement locations which are located on different beams and which have the same vertical spacing with respect to the remote wind measurement device, are evaluated by the evaluation unit to form a horizontal wind speed and a vertical wind speed.

21. The meteorological measurement system according to claim 17, wherein the signal is selected from the group consisting of a electromagnetic signal, an acoustic signal or combinations thereof.

22. The meteorological measurement system according to claim 17, wherein the inhomogeneities producing the reflected portion of the conically radiating signal are caused by particles present in the air.

23. The meteorological measurement system according to claim 17, further comprising a second mast extending in an upward direction from the substrate in horizontally spaced relation to the mast, the second mast carrying a second wave receiver which is arranged at an upper mast tip region of the second mast and operable to receive at least a portion of the reflected portion of the signal.

24. The meteorological measurement system according to claim 23, wherein the second mast carries a second remote wind measurement device including the second wave receiver and a second wave transmitter arranged in the upper mast tip region of the second mast, the second wave transmitter transmitting a second signal, wherein at least a portion of the second signal being scattered or reflected in the atmosphere.

25. The meteorological measurement system according to claim 24, wherein at least a portion of the second signal is received by the second wave receiver.

26. The meteorological measurement system according to claim 24, wherein the wave transmitter associated with the remote wind measurement device and the second wave transmitter are operable to transmit signals at different frequencies such that a frequency of the conically radiating signal from the remote wind measurement device is different from a frequency of the signal from the second transmitter.

27. The meteorological measurement system according to claim 24, wherein the conically radiating signal from the remote wind measurement device and the signal from the second wave transmitter are each transmitted in a temporally pulsed manner.

28. The meteorological measurement system according to claim 27, wherein the signals from each transmitter comprise a wave pulse having a synchronization portion at a beginning thereof transmitted to the other wave receiver for measuring the period of time until the arrival of the respective associated wave pulse.

29. The meteorological measurement system according to claim 24, wherein the second remote wind measurement device is selected from the group consisting of a LIDAR system, a SODAR system or combinations thereof.

30. The meteorological measurement system according to claim 1, in combination with a wind turbine mechanism, wherein the mast is external with respect to the wind turbine mechanism.

31. The meteorological measurement system according to claim 1, further comprising a compensation device for detecting movement of the mast tip relative to the substrate and for compensating for influences caused by the movement on the wind properties measured by the remote wind measurement device.

32. The meteorological measurement system according to claim 31, wherein the compensation device comprises at least one movement measurement device which is arranged in the region of the upper mast tip.

33. A method for measuring the wind condition in an area with the at least one meteorological measurement system according to claim 1, comprising:

establishing a first set of wind conditions in an area which is void of a wind turbine; and establishing a second set of wind conditions in the area which has at least one wind turbine constructed therein, wherein the second set of wind conditions are measured during construction or after completion of the at least wind turbine.

34. A meteorological measurement system comprising:

a meteorological mast extending from a substrate in an upward direction;

a first wind measurement device arranged in an upper mast tip region of the mast and operable as a remote wind measurement device for measuring wind properties at a plurality of remote measurement locations in spaced relation to the remote wind measurement device;

the first wind measurement device being configured to:

transmit a conically radiating signal made up of a plurality of collimated beams radiating upwardly away from the upper mast tip region in a conically diverging fashion, the conically radiating signal being at least one of an electromagnetic wave signal or an acoustic wave signal; and receive at least a reflected portion of the conically radiating signal due to inhomogeneities in air above the first wind measurement device and above the upper mast tip region, at each of the remote measurement locations, and wherein the remote measurement locations are each defined by a distinct volume range at a different predetermined distance elevationally above the first wind measurement device, and bounded by the conically radiating signal; and the first wind measurement device including an evaluation unit for using the reflected portion of the conically radiating signal and determining a wind speed and a wind direction at each of the volume ranges.

35. The meteorological measurement system of claim 34, further comprising a second wind measurement device arranged in the upper mast tip region in proximity to the remote wind measurement device and operable as a local wind measurement device for measuring wind properties at the proximity to the location of the local wind measurement device and in the vicinity of the remote wind measurement device.

* * * * *